United States Patent [19]
Kirk et al.

[11] 3,966,613
[45] June 29, 1976

[54] APPARATUS FOR SPILLING RETRIEVAL

[76] Inventors: William P. Kirk, 22 Glenhaven Circle, Saco, Maine 04072; Dwight W. Reynolds, R.F.D. 1, Box 49, Pownal, Maine 04069

[22] Filed: Jan. 22, 1975

[21] Appl. No.: 543,170

[52] U.S. Cl. ........................... 210/242; 210/DIG. 25
[51] Int. Cl.² ......................................... E02B 15/04
[58] Field of Search ............... 210/83, 242, DIG. 21

[56] References Cited
UNITED STATES PATENTS

| | | | |
|---|---|---|---|
| 3,469,402 | 9/1969 | Lowd | 210/DIG. 21 |
| 3,653,510 | 4/1972 | Fitzgerald | 210/DIG. 21 |
| 3,704,784 | 12/1972 | Clagg et al. | 210/242 |
| 3,730,119 | 5/1973 | Budris et al. | 210/242 |
| 3,737,040 | 6/1973 | Bryday | 210/DIG. 21 |
| 3,744,254 | 7/1973 | Tennelly | 210/242 |
| 3,744,257 | 7/1973 | Spanner | 210/242 |
| 3,788,079 | 1/1974 | Kirk et al. | 210/DIG. 21 |
| 3,788,481 | 1/1974 | de Angelis | 210/242 |
| 3,796,656 | 3/1974 | Avey | 210/242 |
| 3,796,658 | 3/1974 | Meissner, Sr. | 210/242 |
| 3,884,807 | 5/1975 | Heddon | 210/DIG. 21 |

FOREIGN PATENTS OR APPLICATIONS 1,032,121  2/1956  Germany .................... 210/DIG. 21

*Primary Examiner*—Theodore A. Granger
*Attorney, Agent, or Firm*—Kenway & Jenney

[57] ABSTRACT

A catamaran with pivotal fore and aft gates defining a well. When moved through a floating liquid spilling with the fore gate open the well collects spilling. The collected spilling may be pumped directly into a tank. Also, the catamaran is equipped with means to deploy a collapsible, floatable retrieval sheet over and into the well to confine the collected spilling, the aft gate being then opened to set the sheet adrift. A peripheral barrier of air bubbles concentrates the oil toward the center of the well.

7 Claims, 12 Drawing Figures

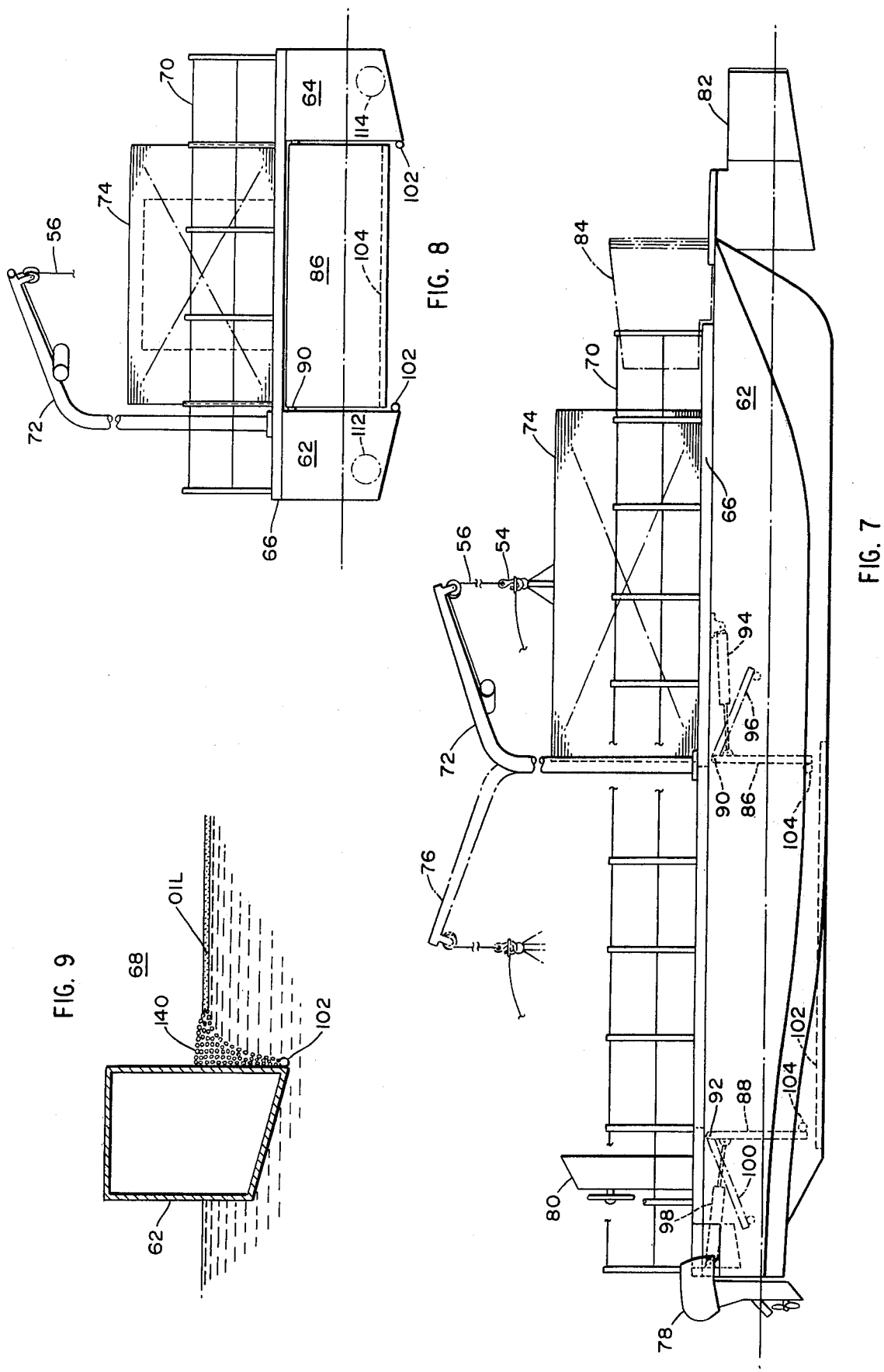

3,966,613

APPARATUS FOR SPILLING RETRIEVAL

RELATED APPLICATION

U.S. application Ser. No. 543,169, filed on even date herewith by the present applicants, is entitled "Retrieval Means for a Floating Liquid Spilling." Said application discloses retrieval means comprising a sheet adapted to be spread over a liquid spilling, and to collapse to confine and concentrate a quantity of the spilling. Retrieval means of this type may be deployed by apparatus of the type described in this application.

BRIEF SUMMARY OF THE INVENTION

This invention relates generally to the art of recovering floating liquids, and particularly oil slicks or spillings from tankers and barges in open water. U.S. Pat. No. 3,788,079, issued Jan. 29, 1974 to the present applicants, describes apparatus for recovering floating liquids, comprising a sheet with weighted periphery. The patent describes means for deploying the sheet by use of explosives which spread the sheet horizontally over the liquid surface, after which the periphery submerge, confining and centrally concentrating the floating liquid.

A principal object of this invention is to provide improved apparatus for collecting floating liquid spillings which may then be pumped into tanks or reservoirs, or confined within retrieval sheets.

A particular object is to provide apparatus suitable for deploying the retrieval means described in said copending application. These means, which are described below in further detail, comprise a sheet having edges forming a quadrilateral, with weight means attached to the edges and adapted to collapse the sheet to confine and concentrate a quantity of the spilling.

Another object is to provide a vessel for transporting the sheets rapidly to spilling-covered areas, so that they may be deployed while the thickness of the spreading slick or spilling is still substantial, thereby obtaining greater efficiency of recovery.

A further object is to provide a vessel that functions not only to deploy the sheet retrieval means in the floating spilling but also to scoop up and concentrate a quantity of the spilling before deploying the sheet, whereby the sheet is released over a quantity of the floating liquid that is substantially thicker than the ambient liquid.

A still further object is to provide a vessel that can be operated in rough seas for the purposes described.

Other objects are related to the foregoing and will be understood from the following description.

With these objects in view, the preferred embodiment of this invention comprises a catamaran construction with spaced parallel hulls and bow and stern gates between the hulls forming a well therebetween, each of the gates being supported by the hulls for independent pivotal movement. The gates are operated in conjunction with the sweeping movement of the catamaran through a body of water having a floating liquid spilling, whereby a quantity of the spilling is caused to accumulate in the well to a predetermined thickness before release of the sheet retrieval means. Alternatively, only one gate may be employed in conjunction with a conventional vacuum hose or skimmer for pumping the well contents into a barge, a floating tank or other suitable reservoir. In the preferred embodiment two gates are employed in conjunction with the sheet retrieval means described.

The catamaran also has diversion booms to assist in collecting the spilling into the well during the sweeping operation.

A feature of the deployment well is the use of an air bubble barrier around its periphery to assist in concentrating the spilling toward the center of the well, thus improving the efficiency of collection by the sheet.

The catamaran has a storage deck adjacent the deployment well, upon which a stack of retrieval means is stored prior to deployment. A jib crane is located in position to deliver retrieval means to the deployment well as needed. Variable ballast means are adapted to change the draft of the catamaran according to the weight of the stack, in order to ensure an optimum draft during the sweeping operation. The draft can also be reduced to reduce the drag on the hulls for rapid movement of the catamaran to the site of a spill.

BRIEF DESCRIPTION OF THE DRAWING

FIG. 7 is a side elevation of the catamaran comprising a preferred embodiment of this invention.

FIG. 8 is a front elevation of the catamaran of FIG. 7.

FIG. 9 is an illustration showing the effect on the captured oil of the air bubble barriers at the sides of the deployment well.

DETAILED DESCRIPTION

Figure 1:
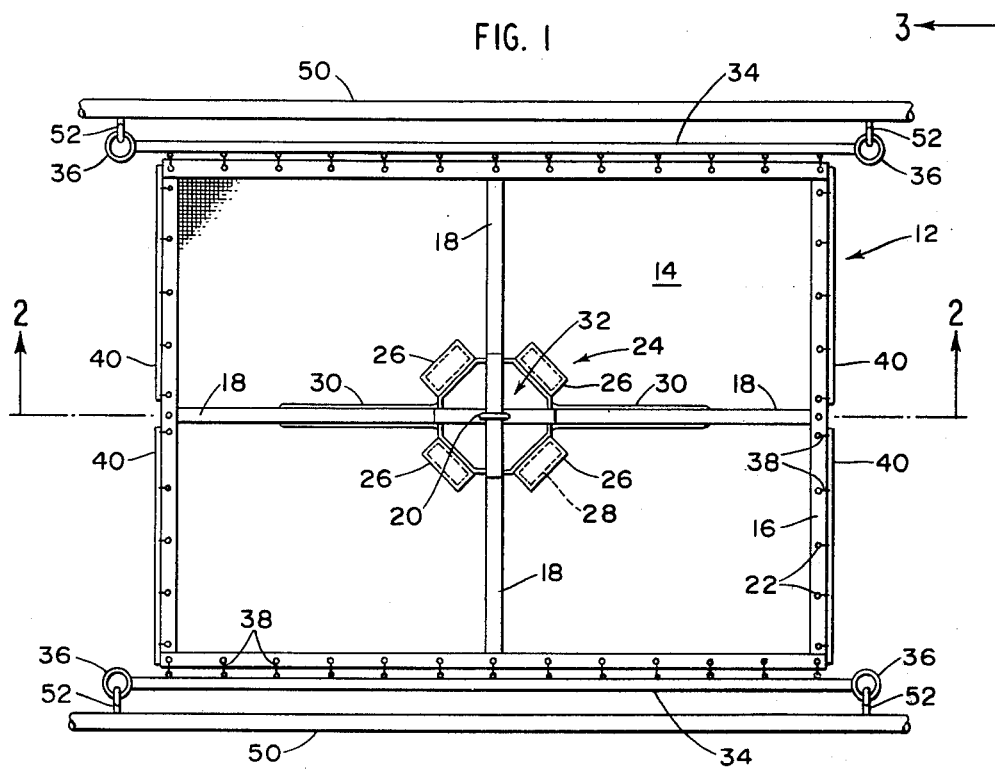
FIG. 1 is a plan view of a retrieval means that may be deployed by the apparatus of this invention for retrieving oil spillings.
Figure 2:
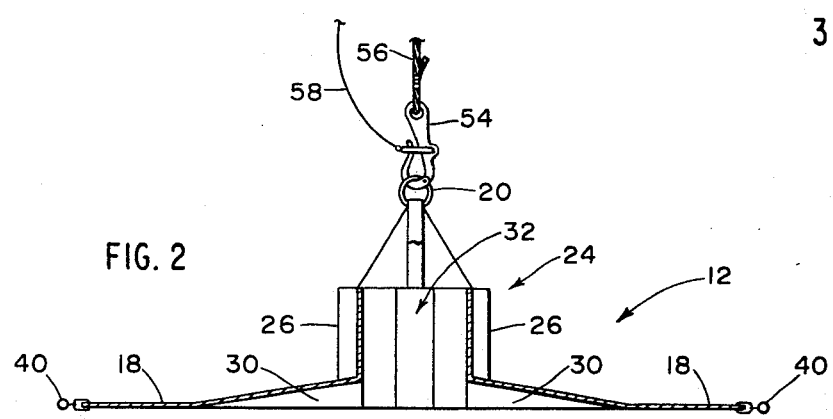
FIG. 2 is an elevation in section taken on line 2—2 of FIG. 1, showing the retrieval means held and suspended in spread configuration preparatory to release.
Figure 3:
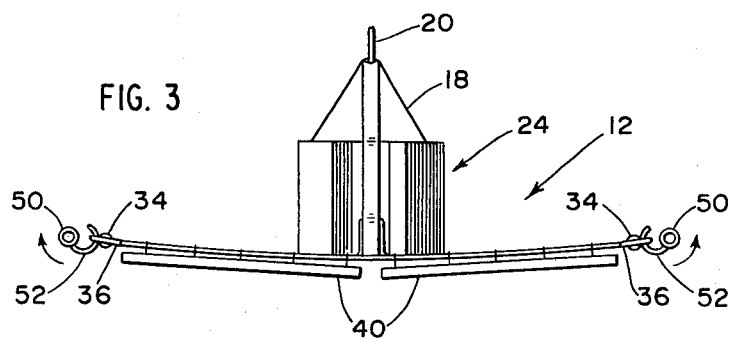
FIG. 3 is an elevation in section taken on line 3—3 of FIG. 1.

Referring to FIGS. 1 to 6, there is shown at 12 a retrieval means of the type preferred for use with the apparatus of this invention. It comprises a flexible sheet 14 with weighted edges and accessory parts for purposes of flotation, deployment and retrieval. The sheet is impervious to the liquid spilling, for example an oil slick floating on the water of a harbor or the ocean. A wide variety of suitable sheet materials may be used. In the experimental forms produced by the applicants the material selected was woven nylon sail cloth coated with a waterproofing plastic material. The sheet may be constructed of one or more pieces stitched together to form a quadrilateral, illustrated in the drawing as a rectangle. The edges of the sheet are preferably hemmed and reinforced with woven cloth webbing tapes 16. Additional woven cloth webbing tapes 18 are stitched to the sheet and extend from the edges of the sheet toward the center, each of these tapes having loose ends attached to a central lifting ring 20. Grommets 22 are fastened to the tapes 16 at spaced intervals around the entire periphery of the sheet 14.

The sheet 14 is preferably provided with central flotation means comprising a collar 24. The collar comprises four cloth bags or pockets 26 joined together in mutually spaced relation by fabric in an annular arrangement. Each of the pockets contains a block 28 of flotation material, such as a closed cellular foam plastic material, or any other material commonly used for flotation in boats, life jackets and the like.

The pockets 26 are joined to one another and to the sheet 14 in such manner as to produce pleats 30 in the sheet 14, the joining fabric forming a central opening 32 in the sheet 14, and the pleats extending along and beneath the webbing tapes 18 and terminating at spaces between the mutually spaced lower portions of pairs of the pockets 26. Thus the pleats 30 provide air channels from spaced points under the sheet, the channels communicating with the central opening 32 through which air under the sheet may pass freely to the atmosphere above the sheet.

The retrieval means is further provided with first and second weight means comprising a pair of side rods 34 preferably of identical form and preferably comprising either substantially rigid metal rods of solid cross section or metal pipes, each extending substantially the length of one of two opposite side edges of the sheet. Alternatively, non-rigid weight means such as chains may be substituted for the side rods 34. A ring 36 is secured to each end of each of the side rods, and serves for supporting and deploying the retrieval means as hereinafter described. Each of the side rods is secured to the sheet 14 by means of a number of T-chains 38, or by snaps, rings, loops or other suitable fasteners passing through the grommets 22.

Each of the other side edges of the sheet 14 has attached to it a pair of end rods 40, the end rods being attached to the sheet by means of additional T-chains 38, or like means as described above. The end rods extend end-to-end substantially the length of each of the side edges and are mutually pivotal in the regions adjacent ends of the webbing tapes 18, by reason of the flexibility of these tapes and of the material of the sheet 14. In the preferred embodiment the end rods 40 are rigid with their respective ends located adjacent ends of the tapes 18. Alternatively, non-rigid weight means such as chains may be substituted for the end rods 40. Thus the weight means around the entire periphery of the sheet 14 may consist of one or more chains instead of the rods illustrated in the drawing.

A tow line 42 is attached to one of the rings 36 on the side rods 34 (FIG. 5) and passes through a ring 36 on the opposite side rod. The line 42 extends to an anchor 44 (FIG. 6), and extends beyond the anchor to form a buoy line fastened to a buoy 46, with a further portion defining a retrieval loop 48. By this means, as further described below, tension on the line 42 draws the rings 36 toward one another, thereby tending to hold the retrieval means in a collapsed configuration.

To deploy the above-described retrieval means, the catamaran of this invention has a pair of mutually spaced parallel spreader rods. In one embodiment these rods take the form of pipes 50 provided with hooks 52, the hooks being open to receive the rings 36. Each of the spreader rods 50 is rotatable about its longitudinal axis. The axes of the spreader rods are held in fixed spaced relationship. In addition, the retrieval means is held suspended by means of a pelican hook 54 on the end of a hoist line 56, the hook having a quick release line 58. The hook passes through the lifting ring 20.

Figure 4:
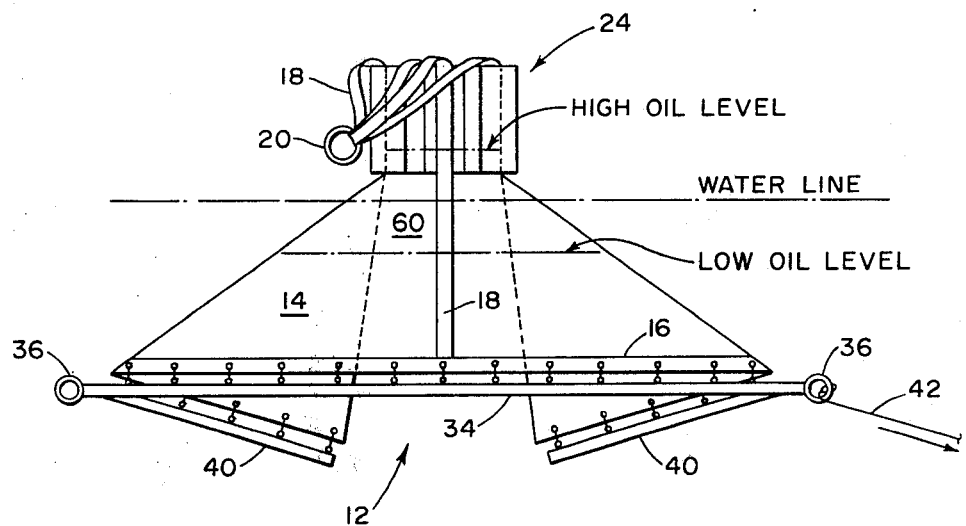
FIG. 4 is a side elevation of the retrieval means in the collapsed, floating position under tow, and confining a quantity of the spilling.

To release the retrieval means, the spreader rods 50 are rotated in opposite directions, and substantially simultaneously the quick release line 58 is pulled to allow the pelican hook to release the lifting ring 20. The retrieval means then falls into the floating liquid by its own weight, and the edges of the sheet 14 are quickly submerged by the weight of the side rods 34 and end rods 40. As the side rods 34 submerge they are drawn toward one another, thereby causing each of the pairs of end rods 40 to pivot into a collapsed position as shown in FIG. 4. Trapped air under the sheet is vented through the opening 32. In this manner the sheet 14 confines and concentrates a quantity 60 of the oil or other floating liquid to be retrieved.

As shown in FIG. 4, the weight of the entire retrieval means including the anchor 44 is suspended by the buoyancy of the contained oil 60; however, if insufficient oil is retrieved to provide this buoyancy, the flotation collar will become partially submerged and will thereby provide any additional buoyancy required.

Thus the retrieved body 60 of liquid is confined within the retrieval means in such manner that it will not be released under windy or rough water conditions. The retrieval means may be allowed to float freely, in which case the line 42 hangs vertically down to the suspended anchor 44 and the buoy 46 floats at the water surface to provide a readily observable means for locating the retrieval loop 48. Thus the anchor and line provide means in addition to the weight of the end rods and side rods to hold the retrieval means in its collapsed configuration.

Figure 5:
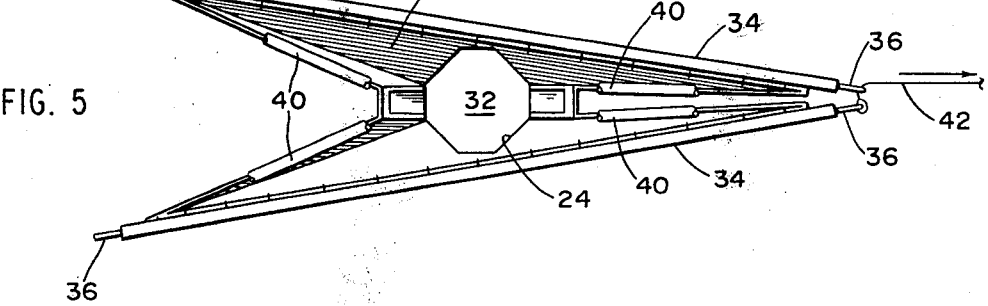
FIG. 5 is a bottom view of the collapsed, floating retrieval means under tow.

If the retrieval means floats into shoal waters under the action of wind and waves, the anchor 44 eventually fetches up on the bottom and holds the retrieval means in the configuration of FIGS. 4 and 5, wherein the direction toward which it tends to be moved is leftwardly as illustrated. Thus means are provided to prevent the retrieval means from being capsized in the shoal waters.

Figure 6:
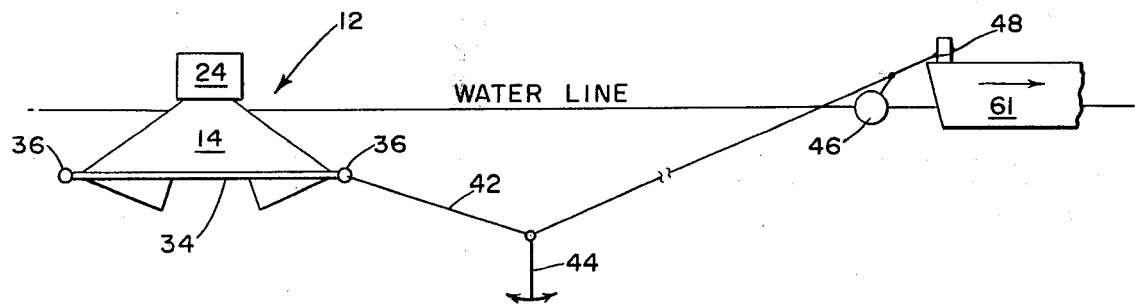
FIG. 6 is an illustration showing the function of the anchor while the retrieval means is under tow.

The retrieval means may be approached in its floating position and recaptured by the catamaran of this invention; or it may be approached by another vessel equipped with a pump and storage tank, and a suction hose may be inserted into the central opening 32 for pumping out the contained oil. Alternatively, the retrieval means may be towed as illustrated in FIG. 6. In this case the retrieval loop 48 is made fast to a vessel 61. With the vessel moving in the direction indicated by the arrow, the tow line 42 is held under tension with the anchor 44 holding the portion attached to the retrieval means in a downwardly directed orientation, thus preventing the retrieval means from pitching and possibly losing a quantity of the contained oil 60.

The catamaran of this invention comprises a pair of hulls 62 and 64, and a deck 66 having a generally rectangular surface with a forward storage deck portion and a rectangular opening 68 comprising a deployment well bounded at the sides by the hulls 62 and 64. Preferably, the peripheral surface of the deck is surrounded by a rail 70. The hulls may be filled with foam plastic flotation means of a conventional type either in bulk or billet form.

A jib crane 72 with a hydraulic hoist is pivotally mounted on the hull 62 at the forward end of the deployment well. A stack 74 of retrieval means of the type described above is situated on the storage deck portion forward of the deployment well, and the crane 72 may be pivoted to swing the pelican hook 54 over the top of the stack 74 in order to pick up one of the retrieval means. The hoist line 56 may then be raised and the crane may be pivoted to the position shown in broken lines 76, directly over the deployment well.

The catamaran may be powered by suitable outboard motors 78 controlled from a panel 80.

Figure 10:
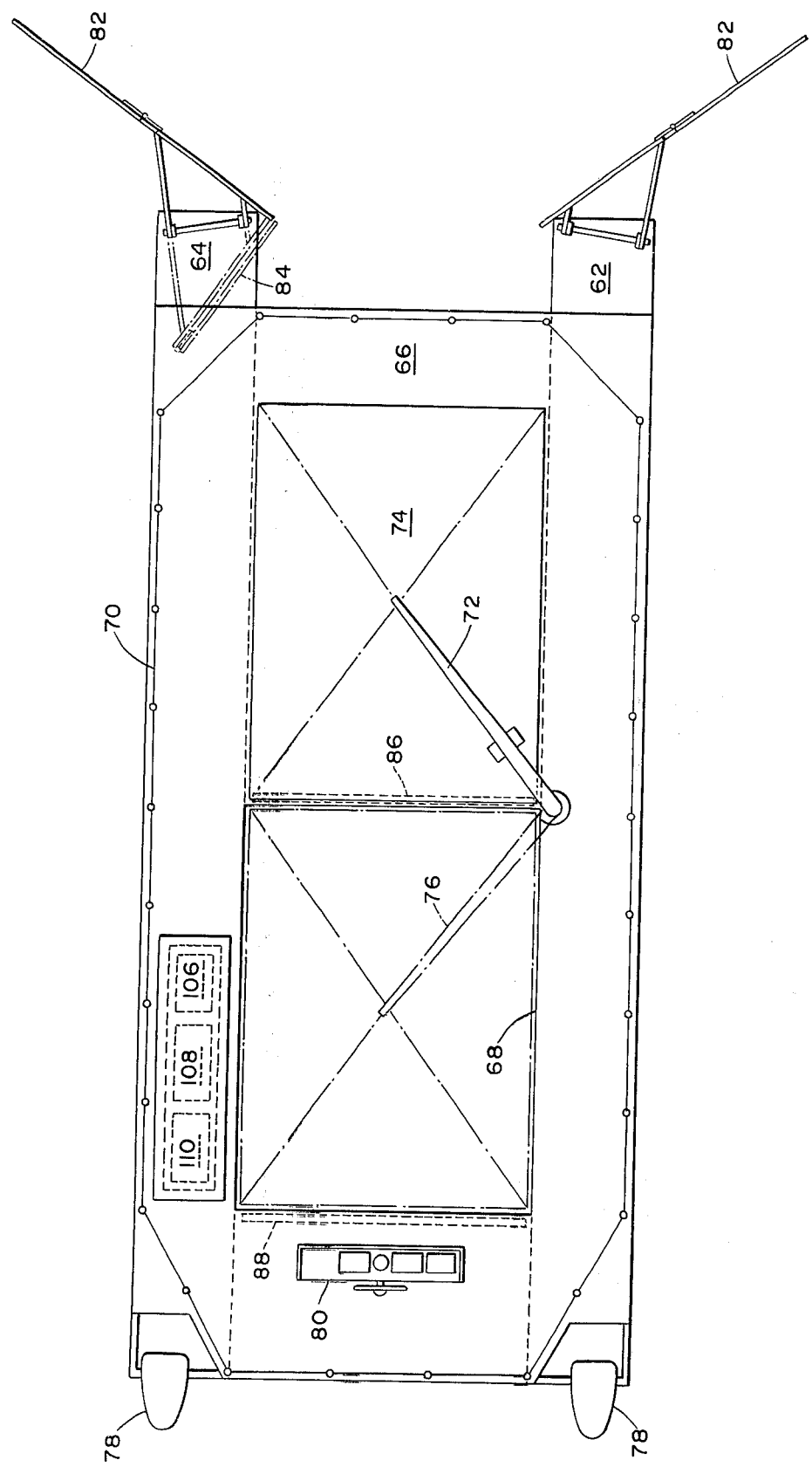
FIG. 10 is a plan view of the catamaran.

Diversion booms or plow blades 82 are supported at the respective bows of the hulls 62 and 64, the booms 82 preferably being pivotal and collapsible from a position extending both above and below the water line as shown in solid lines to a stowed position shown in broken lines 84 in FIGS. 7 and 10.

The catamaran is preferably further equipped with a bow or front gate 86 and a stern or rear gate 88, these gates being located respectively at the bow and stern ends of the deployment well 68. The gates 86 and 88 are respectively pivoted about horizontal axes 90 and 92, these axes preferably being horizontal and extending across the beam of the vessel. The bow gate is attached to a hydraulic cylinder 94 which may be actuated to pivot the gate from a vertical plane to a position shown by broken lines 96. Similarly, the stern gate is attached to a hydraulic cylinder 98 which may be actuated to pivot the gate from a vertical plane to a position shown by broken lines 100.

A system of air bubble pipes extends entirely around the bottom periphery of the deployment well 68, and comprises plastic pipes having spaced perforations, including pipes 102 fastened to the hulls, similar pipes 104 fastened to the bottom edges of the bow and stern gates, and suitable flexible interconnecting pipes or hoses (not shown) by which the air pipes are connected with an air pump or blower 106 preferably mounted within the hull 64. The blower 106 is powered by a gasoline engine 108 which also serves to power a hydraulic pump 110 for operating the cylinders 94 and 98 to raise and lower the gates, and the hydraulic hoist on the jib crane.

The hulls 62 and 64 preferably house ballast tanks 112 and 114, respectively, by which the draft of the catamaran may be varied. Preferably, there are four such tanks, one in each bow and one in each stern, port and starboard. When the catamaran is to be moved quickly to the site of an oil spill, it preferably has a minimum draft to reduce drag. During retrieval operations in which the catamaran normally sweeps in a direction upstream of prevailing water currents, the draft is preferably a maximum to increase the volume of liquid in the deployment well 68. For this latter purpose the draft must be adjusted by varying the amount of water in the ballast tanks according to the weight of the stack 74 of retrieval means on the storage deck.

Figure 11:
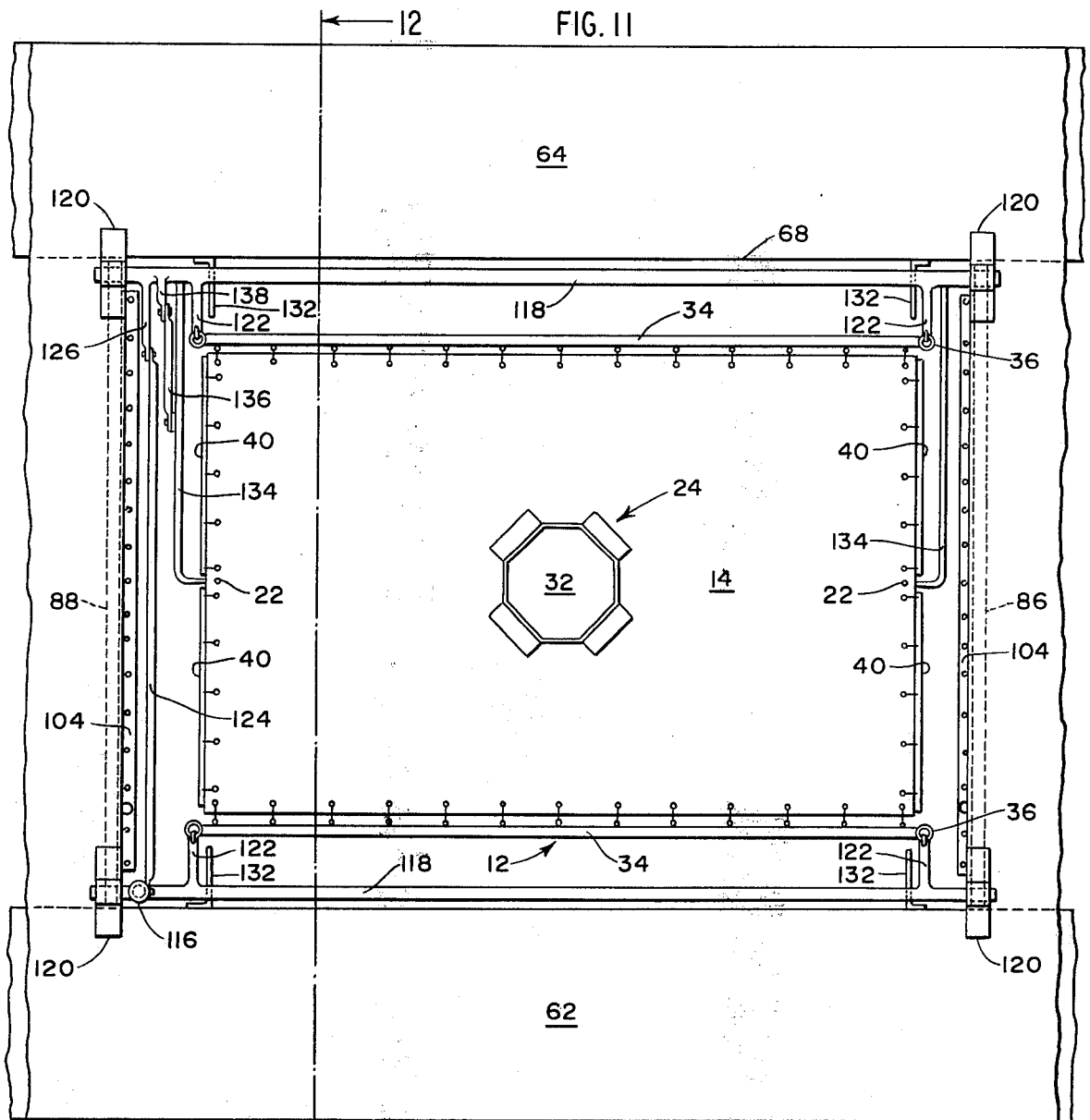
FIG. 11 is a detail plan view of the deployment well.
Figure 12:
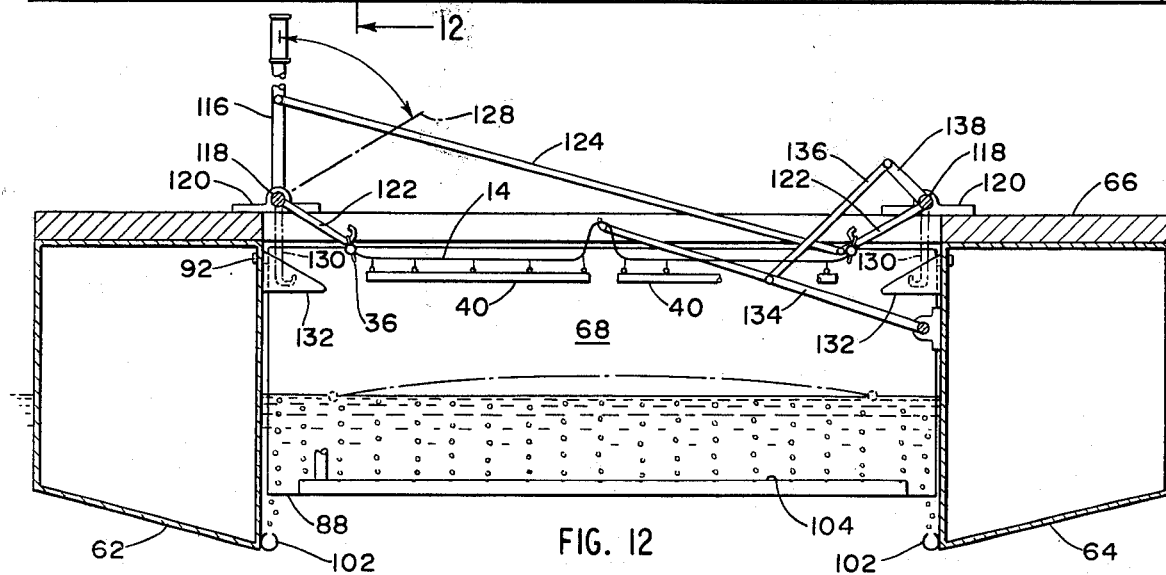
FIG. 12 is an elevation in lateral section taken on line 12—12 in FIG. 11.

A preferred form of apparatus for deploying the retrieval means in the well is illustrated in FIGS. 11 and 12. This apparatus is manually operated by a control arm 116 welded on a spreader rod 118 rotatably mounted on brackets 120 secured to the deck 66, there being a spreader rod on each side of the deployment well, the spreader rods comprising a form corresponding in function to the rods 50 in FIGS. 1 and 3. The rods 118 have elongate hooks 122 to receive the rings 36 on the ends of the side rods 34 of the retrieval means with the retrieval means held in partially collapsed position. A link 124 is connected to a link 126 (FIGS. 11 and 12) secured to one of the spreader bars, whereby rotation of the arm 116 from the position shown in solid lines in FIG. 12 to the limit position shown by broken lines 128 pivots the hooks 122 downwardly to positions shown by broken lines 130, the end portions of the hooks thereby reaching positions adjacent wedge-shaped cam plates 132. If a retrieval means has been mounted upon the hooks 122, this movment fully spreads the retrieval means and swings its side bars 34 into engagement with the upper surfaces of the cam plates 132, unhooking the side bars from the hooks and allowing them to fall into the deployment well.

Another arm linkage provides support for the middle end portions of the retrieval means prior to deployment into the well 68. This linkage comprises arms 134 each pivotally mounted on one of the hulls and hooking at its end into one of the grommets 22 in the sheet 14, and links 136 and 138 connecting the arm 134 with one of the spreader rods 118. Thus the arms 14 lowered concurrently with the hooks 122 for coordinated lowering and unhooking of the center portions of the ends of the deployment means as the same is deployed into the well 68.

The preferred mode of operation of the catamaran is as follows. With the deck loaded with a stack 74 of retrieval means, the ballast tanks 112 and 114 are pumped out and the vessel is rapidly propelled to the site of an oil spill or slick. Preferably both the bow and stern gates are opened to the positions shown at 96, 100 in FIG. 7 to reduce drag.

Upon arrival at the scene of the spill, the ballast tanks are filled to increase the draft, the diversion booms 82 are lowered into the water, and the catamaran is operated on a sweeping pattern preferably upstream and downstream of the surface current, with the stern gate closed, the bow gate open and the air bubble barrier turned on. The depth of the oil collected within the well 68 begins to increase because its density is less than that of water and the liquid that is displaced through the bottom of the well by oil and water entering the front gate is substantially all water. The crane 72 is operated to pick up the first retrieval means and to swing it to a ready position over the deployment well corresponding to FIGS. 2 and 3. In this position the pelican hook 54 is in the ring 20 and the hooks 122 are in the rings 36.

During this period, the bubbles emanating from the pipes 102 and the pipe 104 on the stern gate create a barrier 140 (FIG. 9) that produces a surface current forcing the trapped oil toward the center of the well.

Eventually, the well fills with captured oil, and oil then begins to pass under the stern gate, as will be visually apparent in the wake. At this time the bow gate is closed, the quick release line 58 is pulled and simultaneously the handle 116 (FIG. 12) is lowered. The retrieval means is then fully spread and released, and falls into the well, collapsing and confining the oil in the well as it eventually reaches a position as illustrated in FIG. 4. Thereupon, the stern gate is opened to release the collapsed retrieval means and allow it to drift free from the catamaran. When the retrieval means has cleared the catamaran the stern gate is reclosed and the bow gate is reopened preparatory to a repetition of the foregoing steps with the second retrieval means. From the time the bow gate was closed until it has been reopened as described, oil is collected in front of the bow gate between the diversion booms. The reopening of the bow gate allows this oil to enter the well 68.

It will be noted that the position of the bow gate when open assists in deflecting the wind upward and away from the retrieval means to prevent the latter from catching the wind.

A second mode of operation of the catamaran contemplates the use of means other than retrieval sheets for storing the oil collected in the well 68. Such means may comprise, for example, a floating rubber tank or a barge towed behind or near one or more of the catamarans, together with a vacuum hose or skimmer of conventional construction for transfer of the oil collected in the well to tank or barge. In this case the catamaran may be equipped or operated with only a single gate corresponding to the stern gate 88. The process of oil collection in the well may be more or less continuous with the gate maintained in the closed position, and the pumping or skimming of the oil from the well may be either continuous or intermittent, depending on the rate at which the oil accumulates. This mode of operation is also facilitated by the air bubble barrier which is effective on three sides of the well, concentrating the oil near the center of the well where the skimmer or vacuum hose is preferably located.

We claim:

1. Apparatus for retrieving a liquid spilling floating on water, comprising in combination,
   a catamaran having spaced parallel hulls, and
   bow and stern gates extending between the hulls and forming therewith a well, the walls of the well extending a substantial distance below the surface of the spilling, the bottom of the well having an opening, each of the gates being supported by the hulls for independent pivotal movement, the stern gate being mounted for movement to a position above the water line defined by the buoyancy of the catamaran.

2. Apparatus according to claim 1, having
   a deck extending between the hulls and adjacent the well, and
   a crane having means to deliver sheet-like retrieval means on the deck over and into the well.

3. Apparatus according to claim 2, in which the crane is adapted to hold a sheet-like retrieval means in spread configuration over the well, and having
   hook means supported adjacent the sides of the well in position to receive, hold and release the retrieval means.

4. Apparatus according to claim 3, having
   cam means on the walls of the hull, and
   means to lower the hook means to the cam means to cause the cam means to engage and release the retrieval means.

5. Apparatus according to claim 1, having
   an air pump, and
   bubble barrier means extending along a plurality of sides of the well and below said surface to release a curtain of air bubbles into the well.

6. Apparatus according to claim 5, in which the bubble barrier means include a portion extending along at least one of the gates below said surface.

7. Apparatus according to claim 6, in which the bubble barrier means extend around substantially the entire perimeter of the well.

* * * * *